United States Patent [19]

Iyer

[11] Patent Number: 4,491,017
[45] Date of Patent: Jan. 1, 1985

[54] APPARATUS FOR MEASURING DIMENSIONAL CHANGE OF MATERIALS

[75] Inventor: L. Srinivasa Iyer, Rapid City, S. Dak.

[73] Assignee: South Dakota School of Mines and Technology, Rapid City, S. Dak.

[21] Appl. No.: 353,024

[22] Filed: Mar. 1, 1982

[51] Int. Cl.³ .............................................. G01B 5/00
[52] U.S. Cl. ................................ 73/432.1; 33/147 R; 264/40.1
[58] Field of Search ..................... 73/432 G; 33/147 D, 33/147 T, 147 J, 143 M, 143 R, 147 R, 147 F; 425/140, 141, 171, 150; 264/40.1, 40.5, 256, 333; 249/53, 82, 152, 173, 85, 155; 374/53, 55, 56

[56] References Cited

U.S. PATENT DOCUMENTS

| | | | |
|---|---|---|---|
| 783,451 | 2/1905 | Morenus | 249/85 |
| 2,978,781 | 4/1961 | Shuman | 425/150 |
| 3,061,732 | 10/1962 | Milnes | 73/432 G |
| 3,235,968 | 2/1966 | Wertepny | 33/147 J |
| 3,239,880 | 3/1966 | Oxel | 374/55 |
| 3,291,873 | 12/1966 | Eakin | 249/82 |
| 3,574,281 | 4/1971 | Casey et al. | 374/55 |
| 3,692,450 | 9/1972 | Feldman | 249/155 |
| 3,779,085 | 12/1973 | Rice | 73/432 G |

*Primary Examiner*—Charles Frankfort
*Assistant Examiner*—David R. Schuster
*Attorney, Agent, or Firm*—Abramo & Abramo

[57] ABSTRACT

An apparatus for measuring the dimensional changes which occur in a material, especially a polymer, during polymerization, or curing comprising a mold constructed of polytetrafluoroethylene having a bottom member to which are fixedly attached two side members and a front member to which is slidably attached to the bottom and side members a movable back member to form a cavity for receiving the material; and screws which ultimately are embedded in the material extending into the cavity are attached to the front and back member wherein movement of the back member resulting from dimensional changes during polymerization or curing are monitored by a dial gauge.

5 Claims, 5 Drawing Figures

APPARATUS FOR MEASURING DIMENSIONAL CHANGE OF MATERIALS

BACKGROUND OF THE INVENTION

1. Field of the Invention

This invention relates to a device for measuring a dimensional change of materials and more specifically relates to a device for measuring dimensional change of concrete, polymeric materials and the like.

2. Description of the Prior Art

It is well known that polymeric materials and concrete undergo a dimensional change during polymerization or setting and often with the evolution of a moderate to large quantity of heat of polymerization. Most frequently, the dimensional change which occurs is a shrinkage of the these materials in dimensions. This dimensional change can cause dimensional instability problems of the resultant polymerized or cured polymer in the form of cracks. It would be useful to be able to accurately measure the dimensional change which occurs in a material and more particularly in a material undergoing polymerization or "setting" as a function of time. With this data, polymerization studies could be made which minimize the effects of dimensional change upon the dimensional instability of the final product. Shrinkage results because the heat of polymerization causes the evaporation of volatile monomers or components or the resultant polymerized material has a greater density than the precursor polymerizing mass.

At present, the method available for measuring dimensional changes published by the American Society for Testing Materials (ASTM) relate to Portland Cement mortar (ASTM C 157/75 and C 490/77). These ASTM methods do not provide for the accurate measurement of the dimensional change of polymeric materials.

SUMMARY OF THE INVENTION

This invention is directed to a mold apparatus for measuring the dimensional change of a material undergoing said change comprising a rectangular mold formed by:

(a) a bottom member;
(b) side members fixedly attached to said bottom member;
(c) a front member fixedly attached to said bottom and side members and have a screw extending therethrough;
(d) a movable back member slideably disposed in said bottom and side members to form a mold having a cavity, a screw extending through the said back member and extending into said cavity; and
(e) means for measuring movement of said movable back member when the cavity is filled with said material undergoing dimensional change which causes movement of said movable back member.

BRIEF DESCRIPTION OF THE DRAWINGS

The specific nature of the invention as well as other objects and advantages thereof, will clearly appear from a description of a preferred embodiment as showing in the accompanying drawings in which.

DESCRIPTION OF THE PREFERRED EMBODIMENTS

Figure 1:
FIG. 1 is a top plan view of the apparatus for measuring dimensional change with polymer.
Figure 2:
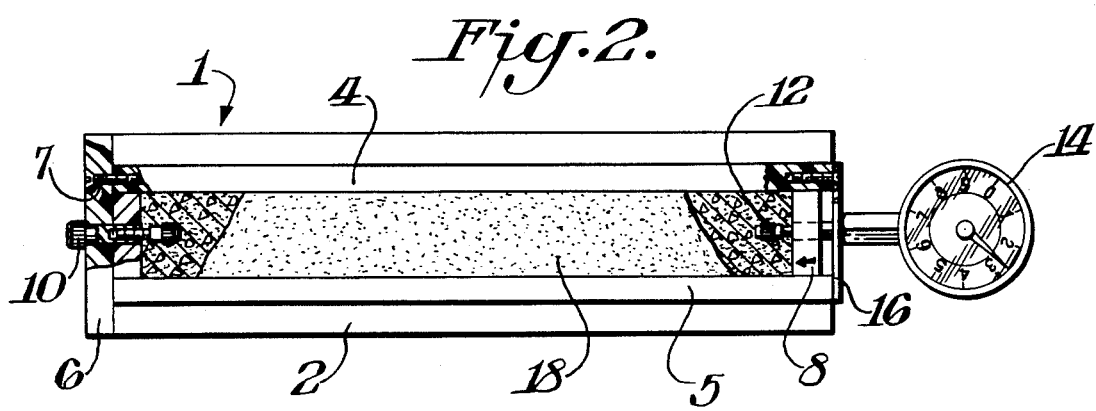
FIG. 2 is a top plan view of the embodiment of FIG. 1 partially broken away.

Referring to the drawings, FIG. 1 shows the mold in which monomer or mixed material can be poured for polymerization into a mold 1. The mold has a bottom member 2, to which is fixedly attached side members 4 and 5, a front member 6 by screws 7 and a movable back member 8.

Together the above bottom, side, front and back members form a cavity 9. A front first screw 10 is attached to the center of the front member and this screw extends into the cavity or interior of the mold. A second screw 12 is attached to the center of the movable back member and this screw also extends into the cavity or interior of the mold. It can be easily seen that polymers cured in the mold form a rod 18 having substantially the dimensions of the cavity with the first and second screw embedded in the ends thereof.

Figure 3:
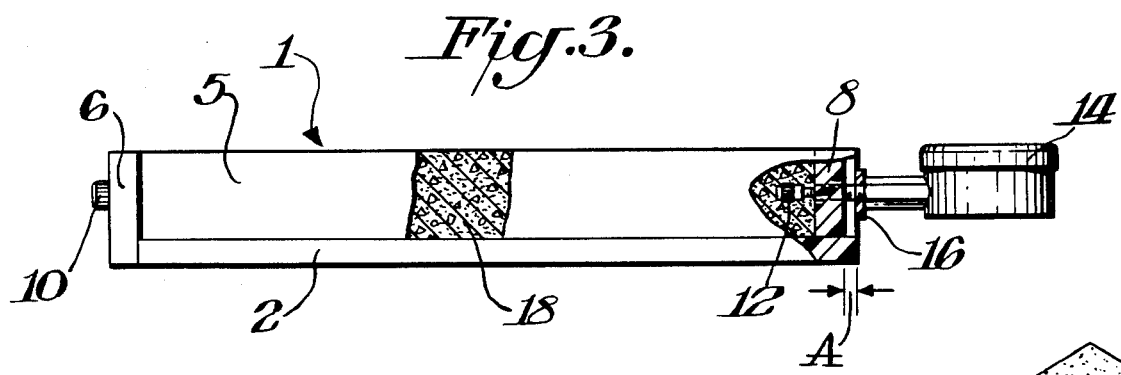
FIG. 3 is a side elevational view of the embodiment of FIG. 1 partially broken away.
Figure 4:
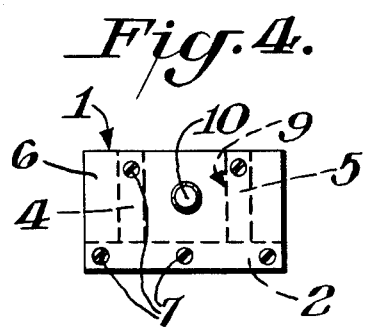
FIG. 4 is a left end elevational view of the embodiment shown in FIG. 1 and FIG. 2.
Figure 5:
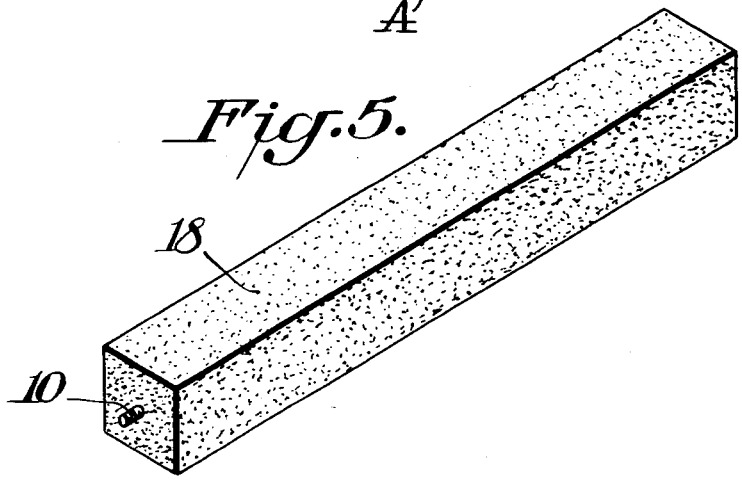
FIG. 5 is a pictoral view of material removed from the mold of the embodiment of FIG. 1 and FIG. 2.

The mold is constructed preferably from a material having a non-adhering surface such as polytetraflouroethylene sheets or stock material which has the requisite thermal stability and a nonadhering surface. The movement of the movable back member is monitored by a mechanical device 14 such as a dial gauge capable of detecting movement of the back member of 0.0001 of an inch or less. A gauge support plate 16 attached to the gauge and resting against the side and back members or other similar device can be used to hold the gauge in place. A device which detects movement electronically such as a linear variable differential transformer LVTD can be used to measure the movement of the back member. The movement of the back member is shown in FIG. 3 as A.

During operation, the substance to be polymerized is placed in the cavity. The polymerization reaction is initiated. As the material polymerizes, a bond is formed between the material and the first and second screws. Dimensional changes, either expansion or contraction, are monitored by the movement of the back member which is slidably attached to the mold.

My process for measuring dimensional changes is applicable for polymeric materials which are fast setting or which are undergoing a cure to the solid state such as polymer mortars, prepregs, polyesters, epoxy resins, adhesive materials, concrete, latex modified concrete, concrete mixes and the like.

I claim:

1. An apparatus for measuring dimensional change of a fluid or solid-fluid mixture undergoing a change to the solid state, said apparatus comprising:

(a) a bottom member comprising a flat plate;
(b) two side members having a front end and a back end and sides fixedly attached to said bottom member along one of its sides;
(c) a front member fixedly attached to said bottom member and to the front ends of each side member;
(d) a movable back member slideably disposed within said bottom and side members to form a cavity consisting of said bottom member, said members and front member;

(e) screw members attached to said front member and movable back member extending into said cavity, said screw members being capable of being embedded in said material place in said cavity; and (f) gauge means operatively connected to said moveable back member for measuring movement of said moveable back member caused by action of said screw members in said movable back member resulting from the change in dimension of said material undergoing said change to the solid state.

2. The mold apparatus of claim 1 which is fabricated from a material having a non-adhering surface.

3. The mold apparatus of claim 2 wherein said material having a non-adhering surface is polytetraflouroethylene.

4. The apparatus of claim 1 wherein the gauge means is a mechanical gauge.

5. The apparatus of claim 1 wherein the gauge means is an electronic device.

* * * * *